(12) United States Patent
Carlstedt et al.

(10) Patent No.: US 6,651,991 B2
(45) Date of Patent: Nov. 25, 2003

(54) ACTIVE ANTI-ROLL STOP FOR STABILIZER BAR

(75) Inventors: Robert P. Carlstedt, Rochester Hills, MI (US); James B. Chamberlin, Charlotte, NC (US); Ragnar H. Ledesma, Sterling Heights, MI (US); Nancy L. Saxon, Oakland Township, MI (US); Dennis A. Kramer, Troy, MI (US); Doyle R. Downey, Beverly Hills, MI (US); Joseph Cubalchini, Jr., St. Charles, IL (US); Monte G. Williams, Royal Oak, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/024,442

(22) Filed: Dec. 18, 2001

(65) Prior Publication Data

US 2003/0111805 A1 Jun. 19, 2003

(51) Int. Cl.7 .............................................. B60G 21/055
(52) U.S. Cl. .............................. 280/5.511; 280/124.107; 267/188
(58) Field of Search ........................... 280/5.508, 5.511, 280/124.107, 124.106, 124.152, 124.166; 267/188, 277

(56) References Cited

U.S. PATENT DOCUMENTS

| | | | |
|---|---|---|---|
| 3,426,375 A | 2/1969 | Jeal | |
| 3,448,994 A | 6/1969 | King et al. | |
| 4,084,838 A | 4/1978 | vor der Bruck et al. | |
| 4,128,259 A | 12/1978 | Trent | |
| 4,623,164 A | 11/1986 | Cassel et al. | |
| 4,648,620 A | * 3/1987 | Nuss | 280/5.511 |
| 4,750,757 A | 6/1988 | Long | |
| 4,784,406 A | 11/1988 | Stinson | |
| 4,927,173 A | 5/1990 | Clifton, Jr. | |
| 4,962,943 A | * 10/1990 | Lin | 280/5.511 |
| 5,217,245 A | 6/1993 | Guy | |
| 5,251,926 A | * 10/1993 | Aulerich et al. | 280/124.107 |
| 5,549,321 A | 8/1996 | Novak et al. | |
| 5,597,180 A | * 1/1997 | Ganzel | 280/5.508 |
| 5,601,165 A | * 2/1997 | Oppitz et al. | 188/296 |
| 5,882,017 A | 3/1999 | Carleer | |
| 6,161,843 A | 12/2000 | Carleer | |
| 6,428,019 B1 | * 8/2002 | Kincad et al. | 280/5.511 |
| 6,513,819 B1 | * 2/2003 | Oliver et al. | 280/124.107 |

* cited by examiner

Primary Examiner—Peter C. English
(74) Attorney, Agent, or Firm—Carlson, Gaskey & Olds

(57) ABSTRACT

A housing attaches a stabilizer bar to the body of a vehicle and includes pin stops which actively control the stiffness of the stabilizer bar. A spring positioned about each of the pins provide a retaining spring force on the head of the pin, preventing the pins from moving into an aperture in the housing. When a sensor detects that lateral acceleration or yaw rate exceeds a threshold value, an actuator drives pins to overcome the spring force, pushing the pins into the aperture. When the pins are actuated, a protrusion on the stabilizer bar is trapped between the pins. When the vehicle turns and the stabilizer bar axially twists, the protrusion eventually contacts one the pins, preventing further rotation and stiffening the stabilizer bar.

18 Claims, 3 Drawing Sheets

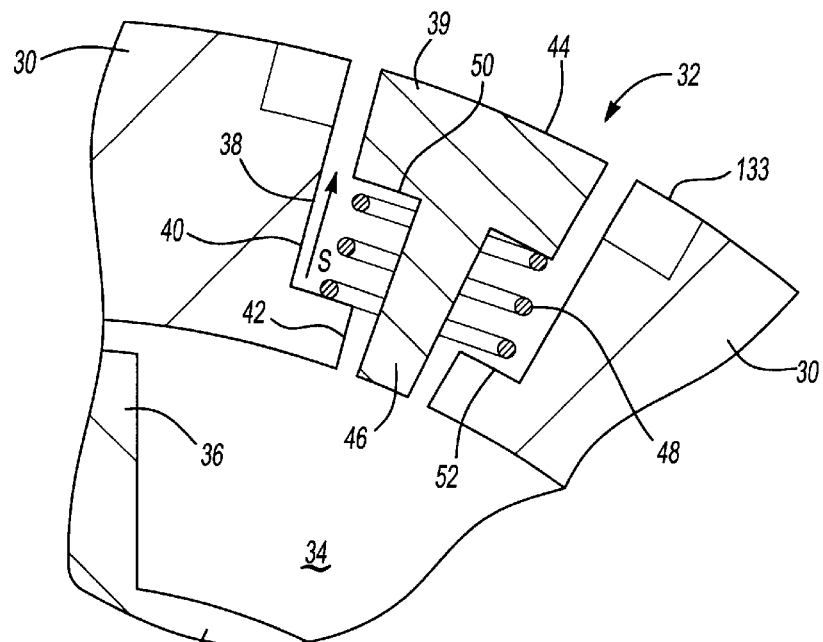
_Fig-3_
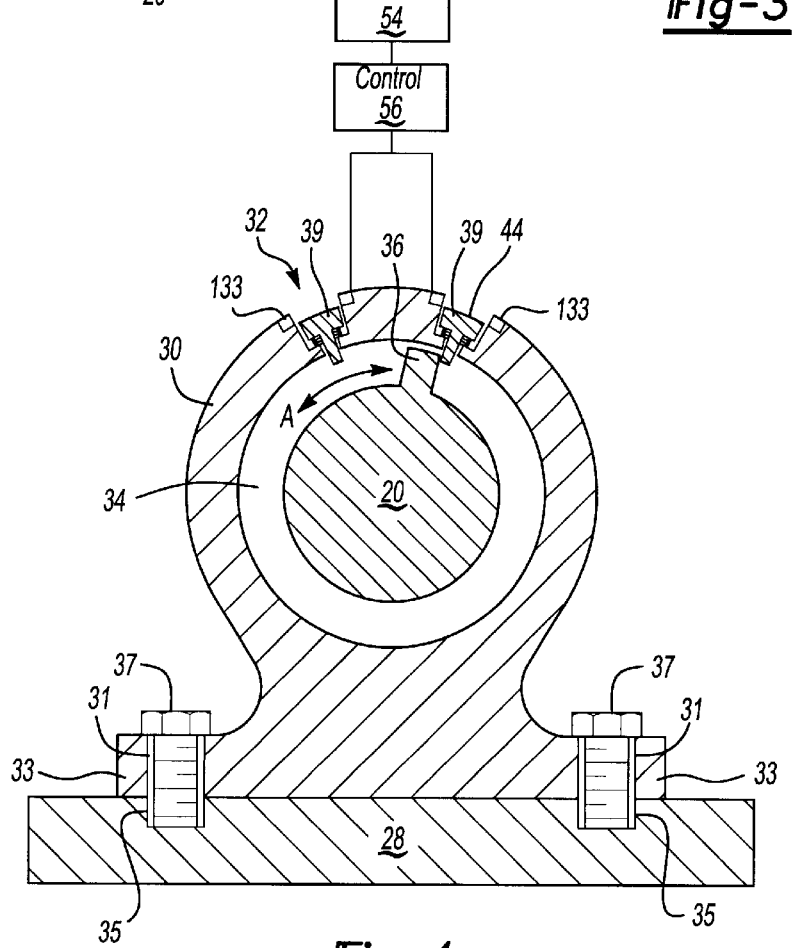
_Fig-4_

ACTIVE ANTI-ROLL STOP FOR STABILIZER BAR

BACKGROUND OF THE INVENTION

The present invention relates generally to a vehicle suspension system including a stabilizer bar with a protrusion which interacts with actively controlled pin stops to control vehicle roll, the pins stops being activated when a sensor detects a roll value greater than a threshold level of roll.

Vehicles are commonly equipped with suspension systems for absorbing road shock and other vibrations, while providing for a smooth and comfortable ride. A suspension component, such as a stabilizer bar, is often used to increase roll rigidity and improve the steering stability of the vehicle. The stabilizer bar is generally attached to the lower A-arms of the suspension system and controls sway as the vehicle turns and provides a pull down force during cornering. This is especially important in sports utility vehicles, which have a higher tendency to roll when the driver attempts an emergency maneuver due to the high center of gravity.

As a vehicle turns, the body of the vehicle rolls to the outside of the turn. The suspension components on the outside of the turn are generally compressed, while the suspension components on the inside of the turn are generally extended. The stabilizer bar counters this motion by pushing up on the suspension components collapsed and compressing the suspension components expanded through torsion in the stabilizer bar.

During cornering, it is desirable that the stiffness of the stabilizer bar be increased. If the stabilizer bar is too compliant, the vehicle will not respond well during cornering, increasing the likelihood of rolling over. However if the stabilizer bar is too stiff, the ride and handling will be compromised during normal vehicle operation. Therefore, it is desirable that the stiffness of the stabilizer bar be variable to adjust for changing driving conditions.

In one proposed vehicle suspension system, a pair of selectively activated variable clamping devices clamp the stabilizer bar to the vehicle body. When a roll sensor detects vehicle roll above a predetermined threshold, a solenoid valve actuates at least one of the clamping devices to provide an actuator force on the stabilizer bar, varying the torsional length of the stabilizer bar. In this prior system, the actuator force is provided by fluid which flows into chambers in the clamping device. As the flow of fluid increases, the actuator force on the stabilizer increases, stiffening the stabilizer bar. This system is undesirably complicated.

SUMMARY OF THE INVENTION

This invention relates to a vehicle suspension system including a stabilizer bar which interacts with actively controlled pin stops to prevent vehicle roll.

A stabilizer bar of a vehicle suspension system is received in an aperture in a housing mounted to the body of the vehicle. A pair of activatable pin stops are positioned in the housing to control the stiffness of the stabilizer bar. The stabilizer bar includes a protrusion which during normal vehicle operation is positioned between the pair of pin stops. A spring positioned about each pin provides a retaining spring force on the head of the pin, preventing the pin from gaining access to the aperture of the housing during normal vehicle operation.

During vehicle operation, a sensor monitors a ride parameter, such as lateral a ration or yaw rate. When the sensor detects that the value of the ride parameter exceeds a threshold value, the sensor activates an actuator, such as a solenoids, to drive the pins. The actuator force overcomes the retaining spring force, activating the pins and pushing the body of the pins into the aperture.

When the pins are activated, the protrusion of the stabilizer bar is trapped between the pins, restricting rotation of the stabilizer bar. When the stabilizer bar twists and the protrusion of the stabilizer bar contacts one of the pins, further twist of the stabilizer bar is resisted, increasing the stiffness of the stabilizer bar and preventing roll-over.

Accordingly, the present invention provides a vehicle suspension system including a stabilizer bar which interacts with actively controlled pin stops to prevent vehicle roll.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 3 illustrates a cross-sectional view of the pins during normal vehicle operation;

FIG. 4 illustrates a cross-sectional view of the housing when the pins are actuated.

DETAILED DESCRIPTION OF THE PREFERRED EMBODIMENT

Figure 1:
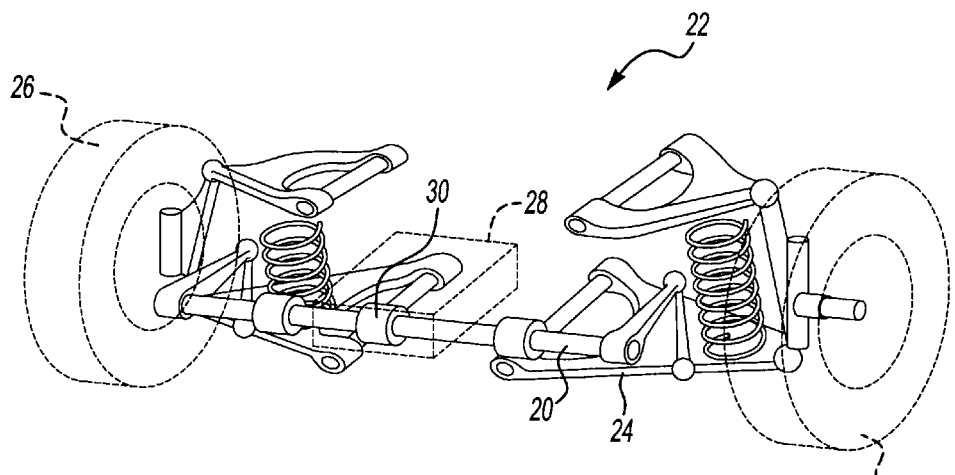
FIG. 1 illustrates a front schematic view of a vehicle suspension system including a stabilizer bar and the housings of the present invention.

FIG. 1 illustrates a stabilizer bar 20 of a vehicle suspension system 22. As shown, the stabilizer bar 20, or anti-roll bar or anti-sway bar, is attached to control arms 24 which are connected to wheels 26. The stabilizer bar 20 is grounded to the vehicle body 28, shown schematically, by a housing 30. Although three housings 30 are illustrated, any number of housings 30 can be employed on the stabilizer bar 20. A worker skilled in the art would know how many housings 30 to employ on the stabilizer bar 20, as well as where to position the housings 30.

Figure 2:
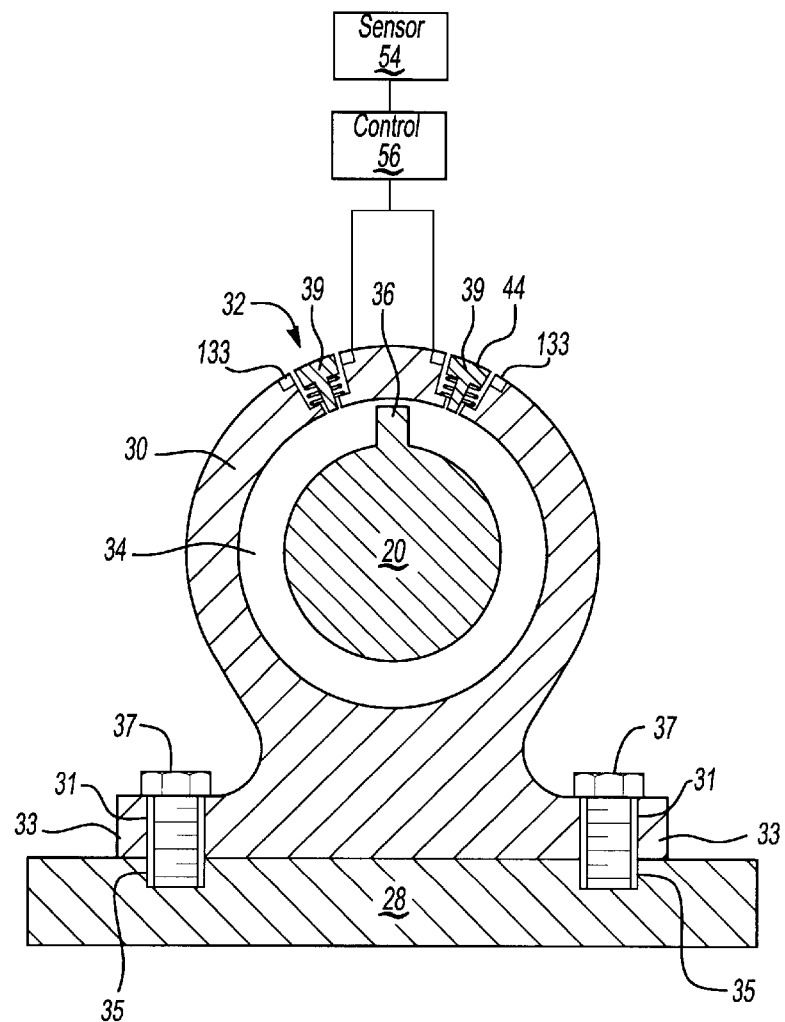
FIG. 2 illustrates a cross-sectional view of the housing during normal vehicle operation.

Preferably, as shown in FIG. 2, the housing 30 includes a hole 31 in each of the bracket arms 33 which align with a corresponding hole 35 in the body 28. An attachment member 37, such as a bolt, passes through the aligned holes 31 and 35 to secure the housing 30 to the body 28. However, other methods of attachment are possible, and one skilled in the art would know how to attach the housing 30 to the body 28.

The housing 30 further includes an aperture 34 which receives the stabilizer bar 20. A pair of pin stop assemblies 32 are positioned in the housing 30 to actively control the stiffness of the stabilizer bar 20. A solenoid actuator 133 selectively drives the pins 39 inwardly, as will be described below. The stabilizer bar 20 includes a protrusion 36 which is positioned approximately between the pin stop assemblies 32 during normal vehicle operation.

As further shown in FIG. 3, each pin stop assembly 32 is positioned in a notch 38 in the housing 30. The notch 38 includes a larger portion 40 and a narrower portion 42 having access to the aperture 34 of the housing 30. A pin 39 is positioned in the notch 38 such that the head 44 of the pin is received in the larger portion 40 of the notch 38, and the body 46 of the pin extends through the narrower portion 42. A coiled spring 48 is positioned about the body 46 of the pin between the lower surface 50 of the head 44 and inner surface 52 of the larger portion 40 of the notch 38. The spring 48 provides a retaining spring force S on the lower surface 50 of the head 44 of the pin, biasing the body 46 of pin away from the aperture 34 of the housing 30 during normal vehicle operation.

As shown in FIG. 4, during vehicle operation, a sensor 54 monitors a ride parameter, such as lateral acceleration or yaw rate. The sensor 54 communicates with a control 56 that detects when the ride parameter exceeds a threshold valve. Control 56 then actuates solenoids 133, which applies an actuator force F on the heads 44 of the pins greater than the retaining spring force S.

Figure 5:
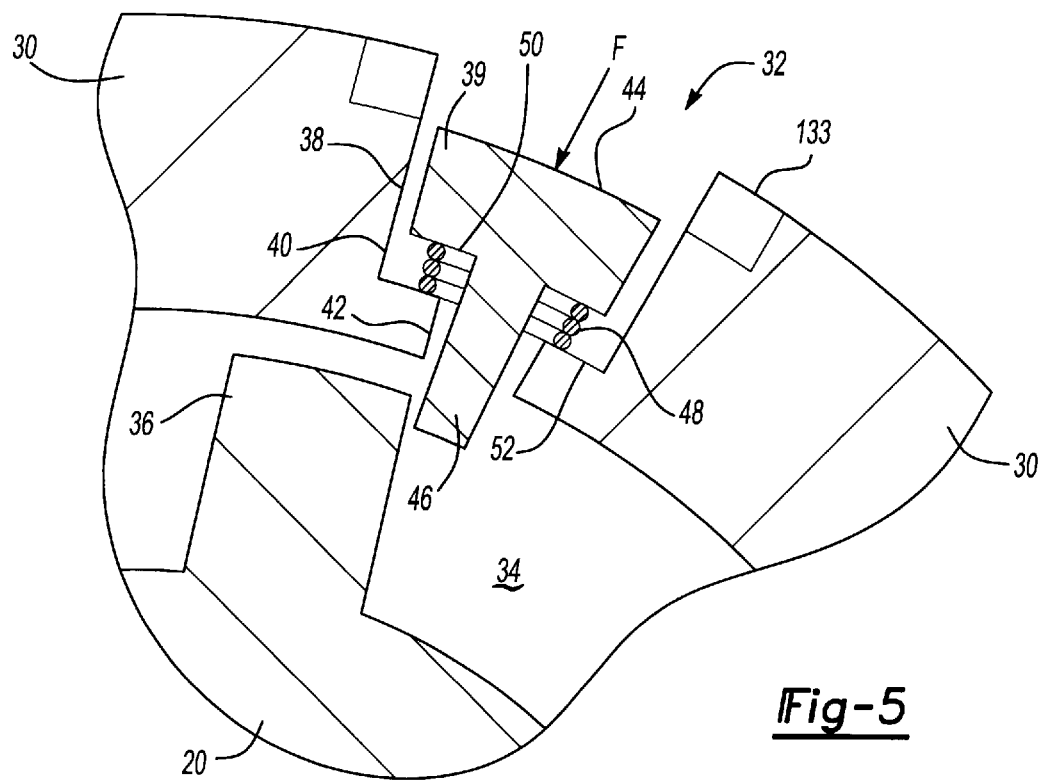
FIG. 5 illustrates a cross-sectional view of the pins when actuated.

As further shown in FIG. 5, when the actuator force F overcomes the retaining spring force S, the spring 48 compresses, allowing the body 46 of each of the pins 39 to enter the aperture 34 of the housing 30. The pins 39 trap the protrusion 36 of the stabilizer bar 20 between the pins 39, restricting the rotation of the stabilizer bar 20 to distance A. When the stabilizer bar 20 twists and the protrusion 36 contacts one of the pins 39, further twist of the stabilizer bar 20 is prevented, stiffening the stabilizer bar 20 and preventing rollover.

During normal vehicle operation, the stabilizer bar 20 is compliant, allowing for a smooth and comfortable ride. As the vehicle turns, the stabilizer bar 20 axially twists to resist vehicle roll. When the sensor 54 detects a ride parameter, such as lateral acceleration or yaw rate, which exceeds a threshold valve, control 56 powers solenoids 133 to drive the pins 39, compressing the springs 48 and pushing the bodies 46 of the pins 39 into the aperture 34. As the stabilizer bar 20 axially twists during a turn, the protrusion 36 eventually contacts one of the bodies 46 of the actuated pins 39, preventing further axial twist and increasing the stiffness of the stabilizer bar 20. When actuated, the pins 39 limit the roll angle and prevent further wheel jounce travel on the outside wheel. The vehicle is less prone to rollover because the vehicle does not lean during cornering.

There are several advantages to utilizing the actuated pins 39 of the present invention on a stabilizer bar 20. For one, the stiffness of the stabilizer bar 20 can be continually controlled and modified according to ride conditions. The housing 30 and pins 39 limit the roll of the vehicle and increase the rollover threshold without adversely affecting the ride characteristics of the vehicle. The stabilizer bar 20 can have low compliance for normal driving, and a high compliance during cornering.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle suspension system comprising:
   a stabilizer bar including a protrusion and connected to a vehicle wheel; and
   at least one housing including a pair of actuatable structures drivable between an extended position and a retracted position, said protrusion of said stabilizer bar interacting with said structures when at said extended position to vary a level of stiffness of said stabilizer bar, and a resilient member provides a spring force on each of said structures to retain said structures in said retracted position.

2. The vehicle suspension system as recited in claim 1 wherein said housing further includes an aperture through which said stabilizer bar passes.

3. The vehicle suspension system as recited in claim 1 wherein said housing secures said stabilizer bar to a vehicle body.

4. A vehicle suspension system comprising:
   a stabilizer bar including a protrusion and connected to a vehicle wheel; and
   at least one housing including a pair of actuatable structures drivable between an extended position and a retracted position and an aperture through which said stabilizer bar passes, said protrusion of said stabilizer bar interacting with said structures when at said extended position to vary a level of stiffness of said stabilizer bar, and wherein said structures do not enter said aperture in said retracted position and structures enter said aperture in said extended position.

5. The vehicle suspension system as recited in claim 4 wherein a spring member provides a spring force on each of said structures to retain said structures in said retracted position.

6. The vehicle suspension system as recited in claim 5 wherein an actuator force greater than said spring force is applied on each of said structures to drive said structures to said extended position.

7. The vehicle suspension system as recited in claim 6 wherein said actuator force for each of said structures is provided by a solenoid.

8. The vehicle suspension system as recited in claim 4 wherein a sensor monitors at least one ride parameter and generates a signal when said at least one ride parameter exceeds a threshold valve, said signal being sensed by a control which drives said structures to said extended position when said at least one ride parameter exceeds a threshold value.

9. The vehicle suspension system as recited in claim 8 wherein said at least one ride parameter is lateral acceleration.

10. The vehicle suspension system as recited in claim 8 wherein said at least one ride parameter is yaw rate.

11. The vehicle suspension system as recited in claim 4 wherein the contact of said protrusion of said stabilizer bar with one of said structures entering said aperture in said extended position limits further rotation of said stabilizer bar, increasing said level of stiffness of said stabilizer bar.

12. The vehicle suspension system as recited in claim 11 wherein rotation of said stabilizer bar when said structures are in said extended position is limited to a distance between said structures.

13. A vehicle suspension system comprising:
   a stabilizer bar including a protrusion and connected to a vehicle wheel;
   a vehicle body;

at least one housing attached to said vehicle body and including an aperture and a pair structures movable between a retracted position wherein said structures do not enter said aperture and an extended position wherein said structures enter said aperture, said stabilizer bar passing through said aperture and said protrusion of said stabilizer bar interacting with said structures when extended to vary a level of stiffness of said stabilizer bar;

a spring member providing a spring force on each of said structures to retain said structures in said retracted position; and a sensor to monitor at least one ride parameter and generate a signal when said at least one ride parameter exceeds a threshold value, said signal being sensed by a control which drives said structures with an actuator force greater than said spring force to move said structures to said extended position when said at least one ride parameter exceeds a threshold valve, contact of said protrusion of said stabilizer bar with said structures in said extended position preventing rotation of said stabilizer bar and increasing said level of stiffness of said stabilizer bar.

14. The vehicle suspension system as recited in claim 13 wherein said at least one ride parameter is lateral acceleration.

15. The vehicle suspension system as recited in claim 13 wherein said at least one ride parameter is yaw rate.

16. The vehicle suspension system as recited in claim 13 wherein rotation of said stabilizer bar when said structures are in said extended position is limited to a distance between said structures.

17. The vehicle suspension system as recited in claim 13 wherein said actuator force for each of said structures is provided by a solenoid.

18. A method for controlling a level of stiffness of a stabilizer bar of a vehicle suspension system comprising the steps of:

mounting a stabilizer bar having a protrusion to a vehicle with at least one housing including an aperture through which said stabilizer bar passes through, and a pair of actuatable structures moveable between an extended position wherein said structures enter said aperture and a retracted position wherein said structures do not enter said aperture;

sensing at least one ride parameter;

generating a signal when said at least one ride parameter exceeds a threshold valve;

moving said pair of structures to position said pair of structures in said extended position when said signal is generated; and interacting said protrusion on said stabilizer bar with one of said pair of structures in said extended position to prevent rotation of said stabilizer bar to thereby increase a level of stiffness of said stabilizer bar.

* * * * *

UNITED STATES PATENT AND TRADEMARK OFFICE
CERTIFICATE OF CORRECTION

PATENT NO. : 6,651,991 B2
DATED : November 25, 2003
INVENTOR(S) : Carlstedt et al.

It is certified that error appears in the above-identified patent and that said Letters Patent is hereby corrected as shown below:

Column 4,
Line 29, please insert -- said -- after "and" and before "structures"
Line 45, please change "valve" to -- value --
Line 55, please delete "the" after "wherein" and before "contact"

Column 5,
Line 19, please change "valve" to -- value --

Column 6,
Line 20, please change "valve" to -- value --

Signed and Sealed this

Sixteenth Day of March, 2004

JON W. DUDAS
*Acting Director of the United States Patent and Trademark Office*